(12) United States Patent
Kim

(10) Patent No.: US 9,048,035 B2
(45) Date of Patent: Jun. 2, 2015

(54) LIGHT-EMITTING BUTTON KEY AND MANUFACTURING METHOD THEREOF

(71) Applicant: HKT CO., LTD., Ansan-si (KR)

(72) Inventor: Moo Yong Kim, Hwaseong-si (KR)

(73) Assignee: HKT CO., LTD. (KR)

( * ) Notice: Subject to any disclaimer, the term of this patent is extended or adjusted under 35 U.S.C. 154(b) by 0 days.

(21) Appl. No.: 13/977,199

(22) PCT Filed: Jun. 11, 2013

(86) PCT No.: PCT/KR2013/005115
§ 371 (c)(1),
(2) Date: Jun. 28, 2013

(87) PCT Pub. No.: WO2013/191405
PCT Pub. Date: Dec. 27, 2013

(65) Prior Publication Data
US 2015/0116978 A1     Apr. 30, 2015

(30) Foreign Application Priority Data

Jun. 18, 2012   (KR) ........................ 10-2012-0065121

(51) Int. Cl.
*H01H 13/702* (2006.01)
*H01H 9/18* (2006.01)
*C23F 17/00* (2006.01)
*B29C 45/00* (2006.01)

(52) U.S. Cl.
CPC .................. *H01H 9/18* (2013.01); *C23F 17/00* (2013.01); *B29C 2045/0079* (2013.01)

(58) Field of Classification Search
CPC ........................... H01H 13/704; H01H 13/702
See application file for complete search history.

(56) References Cited

U.S. PATENT DOCUMENTS

2010/0009121 A1*   1/2010   Kume et al. ................... 428/139

FOREIGN PATENT DOCUMENTS

KR     1020050047275     5/2005

* cited by examiner

*Primary Examiner* — Mary Ellen Bowman
(74) *Attorney, Agent, or Firm* — Cantor Colburn LLP

(57) ABSTRACT

A manufacturing method of a light-emitting button key includes a pressing step of pressing a metal plate and forming a button body opened in one direction; an adhesive coating step of coating an adhesive in the button body; an injection-molding step of injecting a synthetic resin formed of a transparent or semitransparent material into the button body in which an adhesive layer is formed by the adhesive; and a groove machining step of penetrating the button body and adhesive layer from an outside of the button body and thus forming a light transmission groove corresponding to a character, number or symbol. The light transmission groove is formed in the groove machining step is not passed through the penetration part, and the light emitted from the rear side of the button body is radiated to an outside through the penetration part and light transmission groove.

2 Claims, 4 Drawing Sheets

LIGHT-EMITTING BUTTON KEY AND MANUFACTURING METHOD THEREOF

TECHNICAL FIELD

The present invention relates to a light-emitting button key and a manufacturing method, and more particularly, to a light-emitting button key which lightens numbers or characters printed on button keys by using light emitted from the rear side thereof, and a manufacturing method thereof.

BACKGROUND ART

A conventional button key can be classified into two types.

That is, in a film insert type, a character part and a backlighting part are printed on a thin plastic film, and the printed film is formed into a button shape and then inserted into an injection mold, and a button is injection-molded using a transparent plastic material and then assembled separately with a key pad rubber. In a mold type, a button is injection-molded by using a transparent plastic material, and the molded button is colored in a spraying way, and only a character part becomes transparent for backlighting in a laser marking way, and the button is UV-coated in order to secure wear resistance and then boned to a key pad rubber.

However, in the film insert type, the film part may be separated upon being used for a long period of time, and the film may be separated from the injection-molded part during a thermal shock test. In particular, it is not possible to provide the luxurious texture.

Further, in the mold type, the wear resistance is deteriorated, and since it is not possible to provide the metallic texture, there is limitation in providing the luxurious texture.

In order to the above-mentioned problems, the button key is recently formed of a metallic material as described in Korean Patent Laid-Open No. 10-2005-0047275.

FIG. 8 shows a process of manufacturing a conventional button key.

A button-shaped case 10 shown in FIG. 8b is formed by various methods such as pressing or die-casting by using a metal sheet S having a desired thickness, as shown in FIG. 8a, and a space 13 is formed in the case 10.

Then, as shown in FIG. 8c, a cutting process is performed on a surface of the case 10 corresponding to a character or a number, thereby forming a display hole 11.

If the cutting process of the display hole 11 is finished, the molded case 10 is inserted into a mold, and then a transparent liquid thermoplastic resin is put into the space 13 of the case 10, and thus a filling part 20 formed of a transparent plastic material is provided at the space 13 and display hole 11.

In the manufacturing process of the conventional button key, the display hole 11 having a corresponding shape to the number or character is formed first, and the plastic filling part 20 is formed.

Therefore, in case of a portion, such as an "O" shape, that is formed into a closed curve so that inside and outside parts thereof are separated from each other, since the inside part may be moved or separated during the cutting process, it is difficult to precisely form the shape, and thus it is necessary to separately form a supporting portion for connecting the inside and outside parts.

DISCLOSURE

Technical Problem

An object of the present invention is to provide a light-emitting button key that, even in the case that is formed into the closed curve so that the inside and outside parts thereof are separated from each other, it is possible to prevent the inside and outside parts from being separated or moved without the separate supporting portion.

Technical Solution

To achieve the object of the present invention, the present invention can provide a light-emitting button key in which a symbol printed on the button key is lightened by light emitted from a rear side, including a button body which is formed of a metal material to be opened in one direction and in which an etching groove is formed to provide a thin thickness; an adhesive layer which is coated on the etching groove formed in the button body; and a penetration part which is formed of a transparent or semitransparent synthetic resin and bonded to an inside of the button key through the adhesive layer, wherein a light transmission groove having a corresponding shape to a character, number or symbol is formed to penetrate the button body and adhesive layer but not the penetration part, and the light emitted from the rear side of the button body is radiated to an outside through the penetration part and light transmission groove so as to lighten the character, number or symbol formed in the light transmission groove.

Further, the present invention can provide a manufacturing method of a light-emitting button key in which a symbol printed on the button key is lightened when light is emitted from a rear side thereof, including a pressing step of pressing a metal plate and forming a button body which is opened in one direction; an adhesive coating step of coating an adhesive in the button body; an injection-molding step of injecting a synthetic resin formed of a transparent or semitransparent material into the button body in which an adhesive layer is formed by the adhesive so that a penetration part bonded to the button body through the adhesive layer is injection-molded; and a groove machining step of penetrating the button body and adhesive layer from an outside of the button body and thus forming a light transmission groove corresponding to a character, number or symbol, wherein the light transmission groove formed in the groove machining step is not passed through the penetration part, and the light emitted from the rear side of the button body is radiated to an outside through the penetration part and light transmission groove so as to lighten the character, number or symbol formed in the light transmission groove.

Preferably, the manufacturing method further includes an etching step of forming an etching groove in a surface of the metal plate, on which the adhesive is coated, so as to provide a thin thickness, before the pressing step, wherein, in the etching step, a part of the metal plate, in which the light transmission groove is formed, is machined to become thin.

Preferably, the manufacturing method further includes a preheating and drying step of preheating and drying the adhesive coated in the button body; and a solidifying step of heating, drying and solidifying the adhesive preheated and dried in the preheating and drying step, so as to form an adhesive layer, after the adhesive coating step and before the injection-molding step, wherein a thermosetting resin adhesive is coated in the adhesive coating step, and a heating temperature of the solidifying step is higher than that of the solidifying step, and in the injection-molding step, the synthetic resin having a higher temperature than in the solidifying step is injected so as to bon the penetration part to the solidified adhesive layer.

Advantageous Effects

According to the present invention as described above, the light-emitting button key and manufacturing method thereof according to the present invention has the effects as follows:

When forming a light transmission groove having a number or character shape, even though the light transmission groove has the closed curve, such as an "O" shape, so that inside and outside parts thereof are separated from each other, it is possible to precisely form the light transmission groove which can prevent the inside and outside parts from being separated or moved without the separate supporting portion.

Therefore, while the light emitted from the rear side is penetrated through the penetration part and light transmission groove, the light transmission groove having the character, number or symbol can lighten brightly.

DESCRIPTION OF DRAWINGS

The above and other objects, features and advantages of the present invention will become apparent from the following description of preferred embodiments given in conjunction with the accompanying drawings, in which.

BEST MODE

Hereinafter, the embodiments of the present invention will be described in detail with reference to accompanying drawings.

Figure 1:
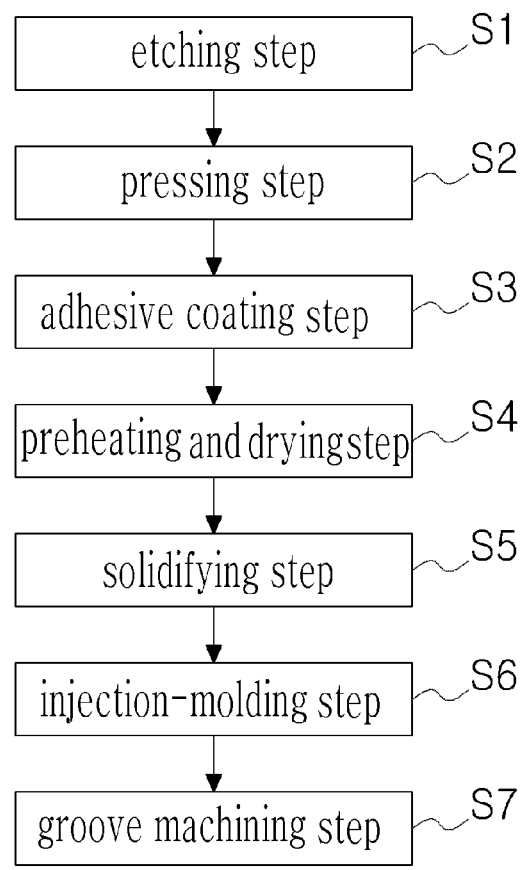
FIG. 1 is a flow chart of a manufacturing method of a light-emitting button key according to an embodiment of the present invention.

A manufacturing method of a light-emitting button key according to the present invention is to manufacture the light-emitting button key which lightens symbols printed on button keys by using light emitted from the rear side thereof, and as shown in FIG. 1, comprises an etching step S1, a pressing step S2, an adhesive coating step S3, a preheating and drying step S4, a solidifying step S5, an injection-molding step S6 and a groove machining step S7.

Figure 2:
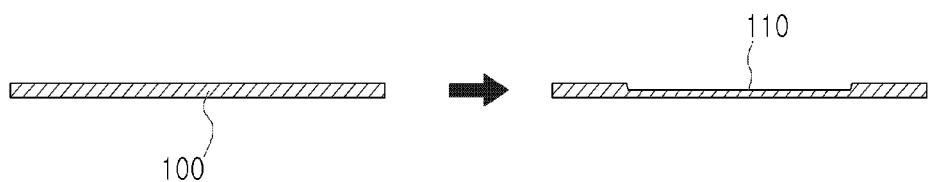
FIG. 2 is a view showing an etching step in the manufacturing method of the light-emitting button key according to the embodiment of the present invention.

In the etching step S1, as shown in FIG. 2, a metal plate 100 formed of steel, aluminum, stainless or the like is processed to be thin through an etching operation.

In the etching step S1, an etching groove 110 is formed in a surface of the metal plate 100, on which an adhesive is coated, such that the metal plate 100 has a thin thickness.

And in the etching step S1, the metal plate 100 is not processed wholly to be thin, but the etching groove 110 is formed at an area that forms a light transmission groove 150 corresponding to a character, number or symbol, and thus only a desired part of the metal plate 100 is processed to be thin.

In other words, a shape corresponding to the character, number or symbol is formed in the light transmission groove 150. In the etching step S1, a part of the metal plate 100 that forms the light transmission groove 150 is formed with the etching groove 110 so that only the desired part thereof is formed to be thin.

Since the etching groove 110 is formed only at the area that forms the light transmission groove 150 by the etching step S1 so that only a thickness of the particular part of the metal plate 100 becomes thin, the light transmission groove 150 can be formed facilely in the groove machining step S7, while maintaining the whole strength thereof.

Preferably, the etching groove 110 has a slightly larger size than the light transmission groove 150.

In the pressing step S2, the metal plate 100 is pressed in order to mold a button body 120 which is opened in one direction.

Figure 3:
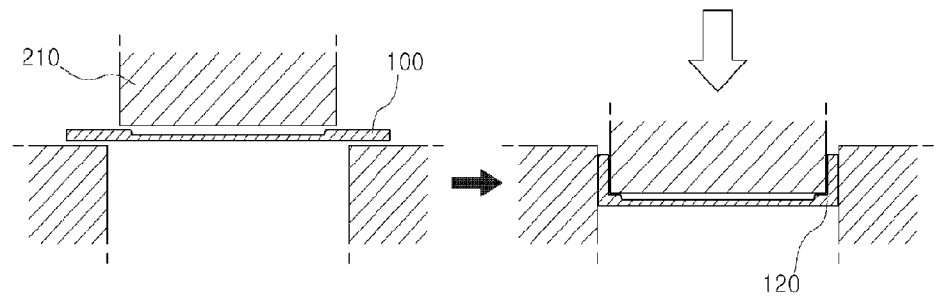
FIG. 3 is a view showing a pressing step in the manufacturing method of the light-emitting button key according to the embodiment of the present invention.

In the pressing step S2, as shown in FIG. 3, the surface of the metal plate 100, on which the etching groove 100 is formed, is directed upwardly, and then pressed by using a press 210 or the like, thereby molding the button body 120 which is opened in one direction, i.e., upwardly.

By the pressing step S2, the etching groove 110 is disposed in the button body 120 so as to be not exposed to the outside.

Figure 4:
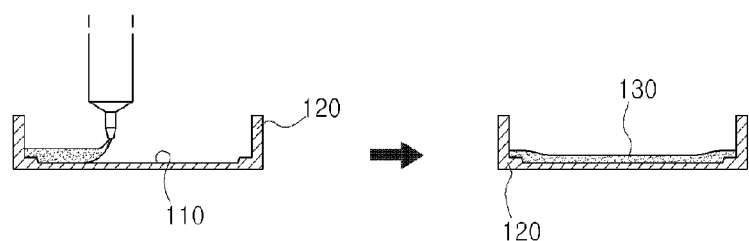
FIG. 4 is a view showing an adhesive coating step in the manufacturing method of the light-emitting button key according to the embodiment of the present invention.

As shown in FIG. 4, in the adhesive coating step S3, an adhesive is coated in the button body 120.

In the adhesive coating step S3, a thermosetting resin adhesive is coated so as to cover the etching groove 110.

In the preheating and drying step S4, the adhesive coated in the button body 120 is preheated and dried.

In the solidifying step S5, the adhesive preheated and dried in the preheating and drying step S4 is heated and dried so as to be solidified, thereby forming an adhesive layer 130.

A heating temperature in the solidifying step S5 is higher than that in the preheating and drying step S4.

The adhesive layer 130 formed in the solidifying step S5 is bonded to the inside of the button body 120.

Figure 5:
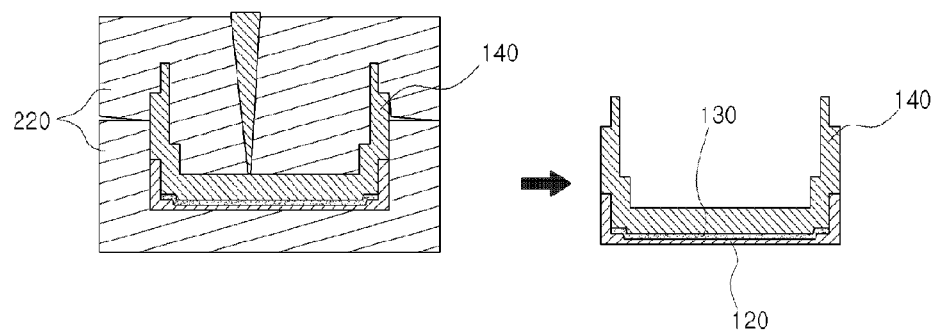
FIG. 5 is a view showing an injection-molding step in the manufacturing method of the light-emitting button key according to the embodiment of the present invention.

In the injection-molding step S6, as shown in FIG. 5, using an injection mold, a synthetic resin formed of a transparent or semitransparent material is injected into the button body 120 in which the adhesive layer 130 is formed, thereby forming a penetration part 140.

The injection-molded penetration part 140 is boned to the button body 120 through the adhesive layer 130.

In the injection-molding step S6, the synthetic resin is injected at a higher temperature than the heating temperature of the solidifying step S5, such that the penetration part 140 is bonded to the solidified adhesive layer 130.

By the above-mentioned processes, the button body 120, adhesive layer 130 and penetration 140 are formed.

Figure 6:
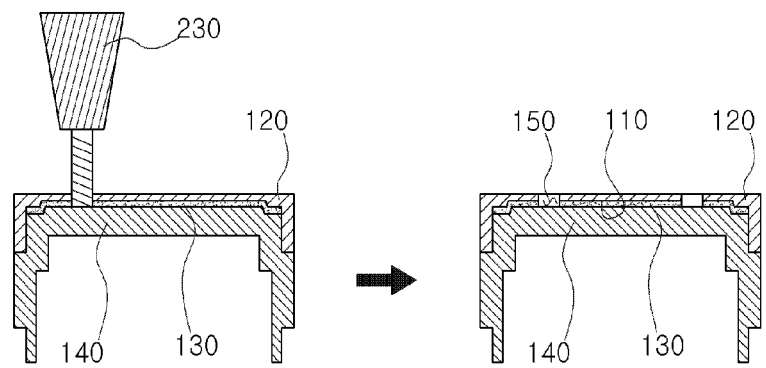
FIG. 6 is a view showing a groove machining step in the manufacturing method of the light-emitting button key according to the embodiment of the present invention.

In the groove machining step S7, as shown in FIG. 6, the button body 120 and adhesive layer 130 are penetrated from the outside of the button body 120 by using a machining means 230 such as drilling machine and a carving machine, thereby forming the light transmission groove 150.

The light transmission groove 150 is formed into a desired shape corresponding to the character, number or symbol. The light emitting button key displays the corresponding shape such as the character, number or symbol through the light transmission groove 150.

Herein, the light transmission groove 150 is formed to penetrate the button body 120 and adhesive layer 130 but not the penetration part 140.

And since the light transmission groove 150 is formed at the thin part that the etching groove 110 is formed, it is easy to machine the light transmission groove 150. Since the etching groove 110 is formed in the part that the light transmission groove 150 is formed, the button body 120 can have a high whole strength.

Further, since the part in which the light transmission groove 150 is formed is thin, it is possible to reduce a machining time for forming the light transmission groove 150.

Herein, since the etching groove 110 is formed in the button body 120 so as to be not exposed to the outside, it is not influenced on the outer appearance thereof.

Figure 7:
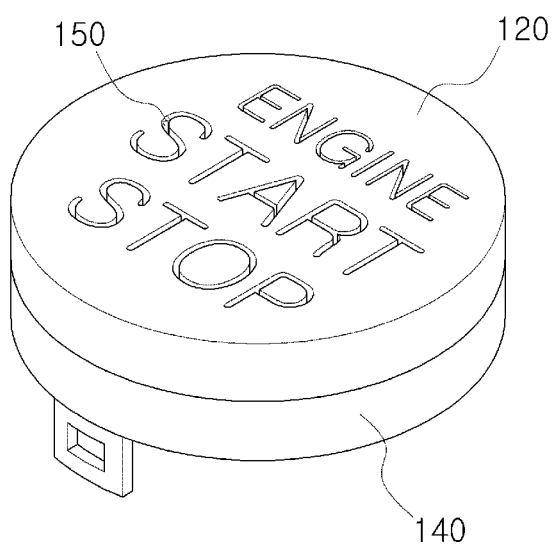
FIG. 7 is a perspective view of the light-emitting button key according to the embodiment of the present invention.
Figure 8:
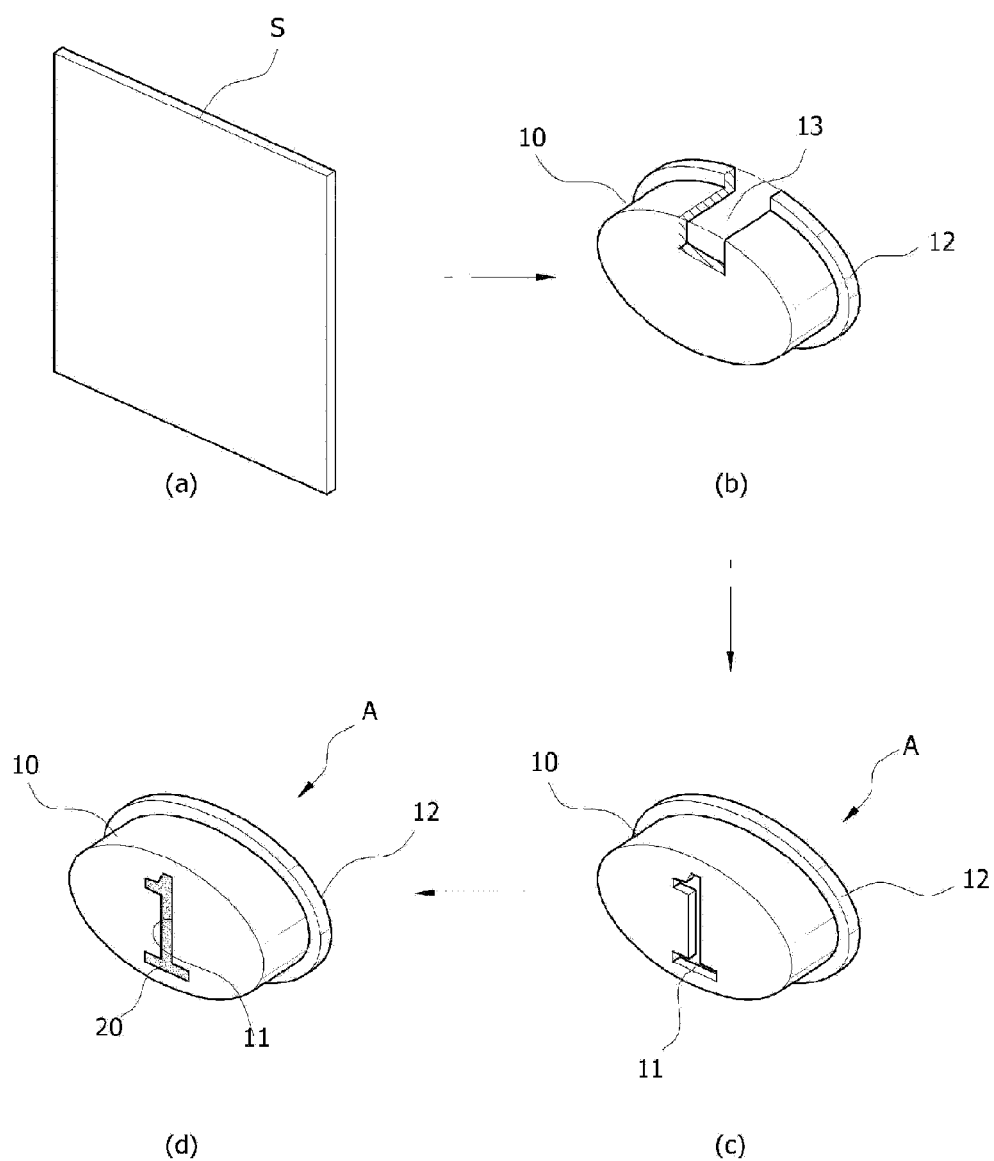
FIG. 8 is a flow chart of a step of manufacturing a conventional button key.

The light-emitting button key manufactured by the above-mentioned processes is shown in FIG. 7.

According to the present invention, since the light transmission groove 150 is formed in the state that the adhesive layer 130 and penetration part 140 are bonded to the button body 120, even when the light transmission groove 150 has an "O" shape that is formed into a closed curve so that inside and outside parts thereof are separated from each other, the inside part is bonded to the adhesive layer 130 and penetration part 140, and thus it is prevented that the inside part of the light transmission groove 150 is moved or separated upon forming of the light transmission groove 150

Therefore, the present invention can have a more precise shape than the prior art.

In the light-emitting button key of the present invention, light emitted from the rear side of the button body 120 is radiated to the outside through the penetration part 140 and light transmission groove 150, and the character, number or symbol formed by the light transmission groove 150 are lightened.

INDUSTRIAL APPLICABILITY

As described above, the present invention can be applied to the light-emitting button key so that the character, number or symbol can be lightened by the light emitted from the rear side.

While the present invention has been described with respect to the specific embodiments, it will be apparent to those skilled in the art that various changes and modifications may be made without departing from the spirit and scope of the invention as defined in the following claims.

The invention claimed is:

1. A manufacturing method of a light-emitting button key in which a symbol printed on the button key is lightened when light is emitted from a rear side thereof, comprising:

a pressing step of pressing a metal plate and forming a button body which is opened in one direction;

an adhesive coating step of coating an adhesive in the button body;

an injection-molding step of injecting a synthetic resin formed of a transparent or semitransparent material into the button body in which an adhesive layer is formed by the adhesive so that a penetration part bonded to the button body through the adhesive layer is injection-molded;

a groove machining step of penetrating the button body and adhesive layer from an outside of the button body and thus forming a light transmission groove corresponding to a character, number or symbol, and a preheating and drying step of preheating and drying the adhesive coated in the button body; and a solidifying step of heating, drying and solidifying the adhesive preheated and dried in the preheating and drying step, so as to form an adhesive layer, after the adhesive coating step and before the injection-molding step, wherein a thermosetting resin adhesive is coated in the adhesive coating step, a heating temperature of the solidifying step is higher than that of the solidifying step, and in the injection-molding step, the synthetic resin having a higher temperature than in the solidifying step is injected so as to bon the penetration part to the solidified adhesive layer; and wherein the light transmission groove formed in the groove machining step is not passed through the penetration part, and the light emitted from the rear side of the button body is radiated to an outside through the penetration part and light transmission groove so as to lighten the character, number or symbol formed in the light transmission groove.

2. The manufacturing method according to claim 1, further comprising an etching step of forming an etching groove in a surface of the metal plate, on which the adhesive is coated, so as to provide a thin thickness, before the pressing step, wherein, in the etching step, a part of the metal plate, in which the light transmission groove is formed, is machined to become thin.

* * * * *